United States Patent
Winnen et al.

(10) Patent No.: US 9,290,404 B2
(45) Date of Patent: Mar. 22, 2016

(54) FREE-FORMED QUARTZ GLASS INGOTS AND METHOD FOR MAKING SAME

(71) Applicants: Michael Peter Winnen, Lakewood, OH (US); Todd R. Springer, Twinsburg, OH (US)

(72) Inventors: Michael Peter Winnen, Lakewood, OH (US); Todd R. Springer, Twinsburg, OH (US)

(73) Assignee: Momentive Performance Materials Inc., Waterford, NY (US)

(*) Notice: Subject to any disclaimer, the term of this patent is extended or adjusted under 35 U.S.C. 154(b) by 0 days.

(21) Appl. No.: 14/155,460

(22) Filed: Jan. 15, 2014

(65) Prior Publication Data

US 2014/0123705 A1    May 8, 2014

Related U.S. Application Data

(62) Division of application No. 11/266,638, filed on Nov. 3, 2005, now abandoned.

(60) Provisional application No. 60/689,507, filed on Jun. 10, 2005.

(51) Int. Cl.
| | | |
|---|---|---|
| *C03B 20/00* | (2006.01) | |
| *C03B 17/00* | (2006.01) | |
| *C03B 19/02* | (2006.01) | |
| *C03C 3/06* | (2006.01) | |
| *C03C 10/00* | (2006.01) | |

(52) U.S. Cl.
CPC ............. *C03B 20/00* (2013.01); *C03B 19/02* (2013.01); *C03C 3/06* (2013.01); *C03C 10/0009* (2013.01); *C03B 2201/04* (2013.01); *C03B 2201/075* (2013.01); *C03C 2201/23* (2013.01)

(58) Field of Classification Search
CPC .......... C03B 19/12; C03B 20/00; C03B 19/09
USPC ................................ 65/35, 64, 102, 108–109
See application file for complete search history.

(56) References Cited

U.S. PATENT DOCUMENTS

| | | | |
|---|---|---|---|
| 2,038,627 A | 4/1936 | Badger | |
| 2,382,187 A * | 8/1945 | Vang | ............... 65/178 |
| 3,093,456 A | 6/1963 | Ross et al. | |
| 3,764,286 A | 10/1973 | Antczak et al. | |
| 4,122,293 A | 10/1978 | Grigorenko et al. | |

(Continued)

FOREIGN PATENT DOCUMENTS

| | | |
|---|---|---|
| DE | 4204406 | 8/1993 |
| JP | 54033514 U * | 3/1979 |

(Continued)

OTHER PUBLICATIONS

Tanabe, Kaici et al. JP 54-33514, Mar. 12, 1979 human translation provided by: United States Patent and Trademark Office Washington, D.C. Oct. 2015 Translated by: Schreiber Translations, Inc.*

(Continued)

*Primary Examiner* — Jodi C Franklin
(74) *Attorney, Agent, or Firm* — Joseph E. Waters, Esq.; McDonald Hopkins LLC

(57) ABSTRACT

A method to form quartz glass ingots of ultra low contamination and defect levels by firing a high-purity quartz form as the feedstock, wherein the quartz glass ingot is free-formed on a platen rotating concentrically with the feedstock quartz article.

9 Claims, 1 Drawing Sheet

(56) References Cited

U.S. PATENT DOCUMENTS

| | | | |
|---|---|---|---|
| 4,200,621 A | 4/1980 | Liaw et al. | |
| 4,612,023 A * | 9/1986 | Kreutzer et al. | 65/32.5 |
| 4,772,302 A | 9/1988 | Abe | |
| 4,871,695 A * | 10/1989 | Seki et al. | 501/54 |
| 4,978,378 A | 12/1990 | Ito et al. | |
| 5,443,607 A * | 8/1995 | Englisch et al. | 65/64 |
| 5,713,979 A | 2/1998 | Nicholson et al. | |
| 5,934,893 A | 8/1999 | Laurenceau et al. | |
| 6,143,676 A | 11/2000 | Ohashi et al. | |
| 6,178,778 B1 | 1/2001 | Kenmochi et al. | |
| 6,381,986 B1 | 5/2002 | Loxley et al. | |
| 6,415,630 B1 * | 7/2002 | Coriand et al. | 65/57 |
| 6,422,861 B1 | 7/2002 | Antczak et al. | |
| 6,502,422 B1 | 1/2003 | Hansen et al. | |
| 7,155,936 B2 * | 1/2007 | Dawes et al. | 65/64 |
| 7,589,040 B2 * | 9/2009 | Dawes et al. | 501/54 |
| 2003/0101748 A1 * | 6/2003 | Ezaki et al. | 65/17.6 |
| 2003/0115904 A1 | 6/2003 | Kuhn et al. | |
| 2004/0185406 A1 | 9/2004 | Neary | |
| 2005/0032622 A1 | 2/2005 | Dawes et al. | |
| 2005/0217318 A1 | 10/2005 | Kuhn et al. | |
| 2005/0272588 A1 | 12/2005 | Sato et al. | |
| 2006/0137399 A1 | 6/2006 | Alan et al. | |
| 2006/0281623 A1 | 12/2006 | Winnen et al. | |
| 2007/0042892 A1 * | 2/2007 | Dawes et al. | 501/54 |
| 2012/0159993 A1 * | 6/2012 | Geertsen et al. | 65/99.1 |

FOREIGN PATENT DOCUMENTS

| | | |
|---|---|---|
| JP | S59-050096 | 3/1984 |
| JP | S59-164644 | 9/1984 |
| JP | S60-141630 | 7/1985 |
| JP | S61-122131 | 6/1986 |
| JP | H3-153537 | 7/1991 |
| JP | 08-133753 | 5/1996 |
| JP | 1996-133753 | 5/1996 |
| JP | 2630613 | 7/1997 |
| JP | 2002-037637 | 2/2002 |
| JP | 2002-097031 | 4/2002 |
| JP | 2003-292337 | 10/2003 |

OTHER PUBLICATIONS

Taiwanese Office Action for Taiwan Patent Application No. 095119025, dated May 1, 2013.

Taiwan IPO Search Report for Taiwan Patent Application No. 095119025, dated Apr. 18, 2013.

Korean Office Action for Korean Patent Application No. 2006-0020019, dated Mar. 28, 2013.

Japanese Office Action for Japanese Patent Application No. 2005-343130, dated Oct. 3, 2011.

Translation of German Office Action for German Patent Application No. 10 2005 057 194.8, dated Feb. 9, 2015.

* cited by examiner

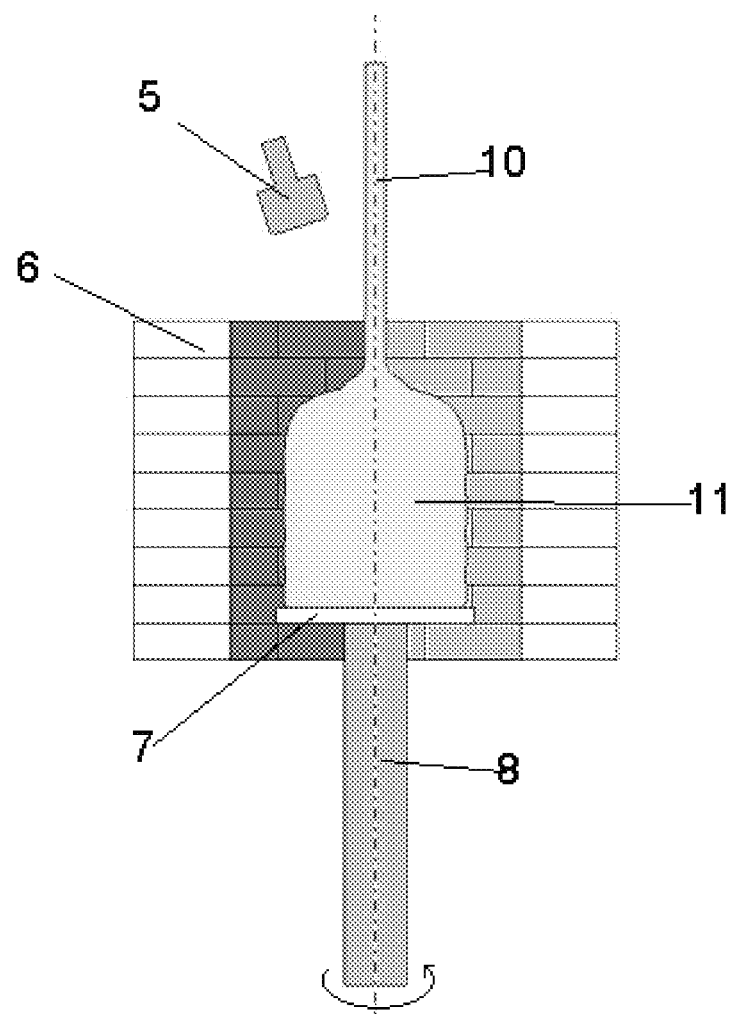

FREE-FORMED QUARTZ GLASS INGOTS AND METHOD FOR MAKING SAME

CROSS-REFERENCE TO RELATED APPLICATIONS

This application is a divisional application of and claims priority to U.S. patent application Ser. No. 11/266,638, filed Nov. 3, 2005, which claims the benefit of U.S. Provisional Application No. 60/689,507 filed Jun. 10, 2005, which patent applications is are fully incorporated herein by reference.

FIELD OF INVENTION

The invention relates to quartz glass ingots of low impurity level and defect concentration for use in semiconductor processing applications. The ingots are made by using direct-drawn quartz articles as a feedstock.

BACKGROUND OF INVENTION

Semiconductor wafer processing for microchip fabrication requires, among other steps, sequential and repeated steps such as masking, deposition, and etching. In the etching step, the wafer and the chamber in which the etching takes place are exposed to an aggressive environment, e.g., reactive ion etch and plasma etch. Due to the aggressive nature of the etch processes, the etch chamber materials must be selected carefully for reliable wafer processing. Therefore, the innermost etch chamber components are typically fabricated from quartz glass. Etching of pure quartz glass theoretically results in liberation of only silicon and oxygen species. These are less harmful to the wafer, as compared to transition metals and other elements, which would modify the composition and therefore the semiconducting properties of the wafer.

One example of a chamber component is a quartz glass window. In one configuration, the quartz glass window serves as a partition between the chamber atmosphere and the energy source. Because the window is typically positioned above the semiconductor wafer to be etched, it is imperative that the quartz glass window is as chemically pure as possible, i.e., having less than 50 ppm impurities. It is also imperative that the window has a very low concentration of bulk defects, e.g., foreign material inclusions and bubbles. Such bulk defects, when exposed to the etching atmosphere at the surface of the quartz glass window, can cause inhomogeneous etching of the window, thus generating quartz glass particles. Loose particulate matter within the etch chamber can be severely detrimental to the wafer. The size of such particles (1 to 10 microns) relative to the etched features (about 50 nanometers) on the wafer surface makes the particles potentially quite destructive. These particles may block gates and destroy conductive vias on the wafer or contaminate the wafer with impurity elements. Therefore, wafer etching chambers require quartz glass windows that etch slowly and uniformly without generating particulates.

Making quartz ingots using a sand-based flame fusion process is known in the art. Generally, this involves feeding a particulate quartz material through or near an oxy-fuel flame to gradually build up a massive glass ingot through an accretion process of relatively slow deposition rates, e.g., at 5 lbs/hr or less. The flame fusion process has the advantage of exposing individual particles to the full power of the heat source. However, this deposition-oriented process has the disadvantage of exposing each particle to contamination in the feed system and in the furnace atmosphere with each sand particle being an opportunity to form a defect in the ingot. The individual sand grains are exposed to the heat of the oxy-fuel flame and the product of the combustion reaction, water. The exposure yields quartz articles with hydroxyl concentration of greater than 150 ppm, which changes the temperature dependent viscosity of the fused glass, thus limiting its end-use applications.

Published application JP-61122131A discloses a glass ingot manufacturing device and glass ingots made thereof. U.S. Pat. No. 4,612,023 discloses a method for manufacturing stria-free, bubble-free and homogeneous quartz glass plates. U.S. Pat. No. 6,415,630 discloses an apparatus for producing a homogeneous quartz glass plate without streaks, in which the melting pot and the quartz glass rod undergo a relative motion perpendicular to the longitudinal axis of the rod.

In the prior art, quartz glass rods may be used as feedstock to form larger glass shapes. However, interfacial defects associated with material accumulation and overlay may still be experienced. In one prior art process, in which a laminate-type configuration to build up material (laying successive layers of softened glass on top of each other) is used, interfacial defects may result from a number of causes. These include entrained gas bubbles, entrained discrete impurity particles, entrained chemical impurities, and fold lines. Additional process steps may be required to reduce or eliminate such defects in the fused mass. Additionally, the process requires the use of refractory molds or containers to form the final shape of the glass ingot. Refractory in contact with the fused glass ingot is a source for contamination that can cause defects in the ingots. Furthermore, thermal expansion mismatch between the fused quartz glass and the refractory can cause spalling or cracking in the ingot.

There is a still need for ultra-low defect quartz articles from which such components for semiconductor processing assemblies can be fabricated, i.e., ingots with a hydroxyl concentration of less than 150 ppm and a total defect concentration (bubbles and inclusions greater than 10 micrometers in diameter) of less than 150 per $cm^3$.

SUMMARY OF INVENTION

The invention relates to a method for forming a quartz glass ingot of ultra low defects and impurities by firing a high-purity quartz article as a feedstock, wherein the quartz glass ingot is free-formed on a platen rotating concentrically with the feedstock quartz article.

In one embodiment, the invention relates to a method for forming a quartz glass ingot having a total defect concentration of less than 50 defects per $cm^3$ and a hydroxyl concentration of less than 50 ppm, by firing a high-purity quartz article as a feedstock, wherein the quartz glass ingot is free-formed on platen rotating concentrically with the feedstock quartz article.

The invention further relates to quartz glass articles in the form of ingots, plates, blanks, and the like, having a total defect concentration of less than 50 defects per $cm^3$ and a hydroxyl concentration of less than 50 ppm.

BRIEF DESCRIPTION OF THE DRAWING

FIG. 1 is a schematic diagram of an embodiment for a device for making the quartz glass article of the invention.

DETAILED DESCRIPTION OF THE INVENTION

As used herein, approximating language may be applied to modify any quantitative representation that may vary without resulting in a change in the basic function to which it is related. Accordingly, a value modified by a term or terms, such as "about" and "substantially," may not to be limited to the precise value specified, in some cases.

As used herein, quartz glass articles refer to quartz glass plates, ingots, blanks, and the like, of various sizes and thickness from which quartz blanks in the form of rings, flanges (thick rings), plates, disks, windows, etc. can be machined or fabricated.

As used herein, "quartz glass ingot" refers to the end-product of the invention, which may be in the form of blanks, ingots, plates, and the like, having a total defect concentration of less than 50 defects per $cm^3$ and a hydroxyl concentration of less than 50 ppm. Quartz ingots of the invention may be used in window components in semiconductor processing chambers.

As used herein the term "reflow" refers to a process inherent to a material like quartz or glass, when the material is soft such that it can flow/melt under action of its own weight, and redistribute itself.

As used herein, a defect refers to either a bubble or an inclusion with a diameter greater than 10 micrometers, and total defect concentration refers to the total number of defects per unit volume. Defects may be measured by taking samples (e.g., in coupon form) from random locations in the quartz ingots and examined visually under magnification. The defects are counted and the total defection concentration is computed from the total count and the total sample volume from multiple samples.

Feedstock to Make Quartz Ingots:

As used herein, quartz glass feedstock refers to any fabricated quartz glass article, which may be in the form of rods, tubing, and the like, having either a solid or a tubular cross-section and having a cross-sectional shape with any number of sides ranging from 3 sides to an infinite number sides, including a circular cross-sectional shape. In one embodiment, the quartz glass feedstock has a solid cross-section and a circular cross-sectional shape. In another embodiment, the quartz glass feedstock is a direct drawn quartz glass rod.

As used herein, "quartz glass rod" refers to any fabricated quartz glass article that is used as the feedstock to the invention, which may be rods, tubing, and the like, having a solid or a tubular cross-section. In one embodiment, the fabricated quartz glass article for use as the feedstock has a cross-sectional shape with at least 3 sides. In another embodiment, the fabricated quartz glass feedstock is a rod having a solid cross-section with a circular cross-sectional shape. In one embodiment, the glass rod has a diameter of between 1 and 100 mm. In another embodiment, the glass rod has an outer diameter of between 20 and 50 mm.

In one embodiment, the quartz glass rods for use as feedstock are manufactured from natural quartz crystals. In another embodiment, the rods are manufactured from synthetic silica. In a third embodiment, the feedstock includes rods of natural quartz crystals as well as rods made from synthetic silica. In one embodiment, the quartz glass feedstock is a fabricated quartz glass article having a content of at least 85 wt. % $SiO_2$. In another embodiment, the fabricated glass article is a solid or tubular elongated shape that has been sintered from a soot body, or any other high purity particulate mass made from flame hydrolysis.

Following the feedstock fusion step, manageable lengths of quartz glass rod feedstock may be further annealed to remove hydroxyl (OH) groups and lower the OH concentration below approximately 50 parts per million. Surface and/or end preparation for the rod segments including cleaning steps are contemplated. It is known in the art that joining of glass rods can be accomplished with conically shaped end regions. In one embodiment of the present invention, the quartz glass rod feedstock segments have ends that are formed into a desired end shape then pre-cleaned before the pre joining and semi-continuous ingot fusion steps. The pre-cleaning step is accomplished by any of a variety of means including but not limited to acid washing, detergent washing, or any combination thereof.

Process for Making Quartz Ingots:

Referring now to the schematic drawing of FIG. 1, which depicts the fusing or firing apparatus in the invention. The feedstock to the process is shown in the form of a quartz rod 10. The end-product quartz ingot 11 is end-supported on a platen 7 such that its longitudinal axis is in a vertical position. In one embodiment, platen 7 is positioned on a horizontal turntable (not shown). The platen 7 rotates about a vertical axis by means of a drive shaft 8 connected to a suitable variable speed drive means (not shown) of any known construction, such as for example an electric motor. In one embodiment, a refractory heat shield and furnace roof (not shown) are provided in order to further localize heating of the rod feedstock 10.

In one embodiment, the longitudinal axis of feedstock 10 and the vertical axis of platen 7 (and optional turntable) are concentric, such that their axes are substantially aligned, e.g., coaxially. The longitudinal axis of the end-product ingot 11 is thus similarly aligned with the axes of feedstock 10 and platen 7, for an axi-symmetric reflow process. In another embodiment, there is a maximum eccentricity of no more than one feedstock diameter between the axes of the feedstock and the ingot.

A firing/heating source 5 is provided to attain a quartz glass working/softening/flow temperature in the range of 1400° C. to 2400° C. Heating source 5 may be any of the following, or combinations thereof: resistive heating, RF heating, induction heating, microwave heating, laser heating, electron beam heating, zone heating, plasma torch heating, or a burner.

In one embodiment as illustrated in FIG. 1, a burner 5 is used to provide heat for reflow of the rod feedstock 10 into large ingots. Such a burner is ignited and delivers heat to a refractory furnace through a flame column. In one embodiment, the burner is an "oxy-fuel burner," which is supplied with a combustible gas such as hydrogen, carbon monoxide, methane or propane, and a combustion-supporting gas such as air or oxygen. The burner may be a type of burner commonly used for this purpose, such as one in which the center portion has a multi-tube construction. Further, the burner may have a surface mix, partial pre-mix, or fully pre-mixed construction.

In one embodiment, the burner is of the design and construction as disclosed in U.S. Pat. No. 5,934,893, titled "Burner and Utilization of Such Burner in Glass Furnace." In another embodiment, the heating source 5 is moved relative to the rod feedstock 10 for a time sufficient to completely fire the feedstock 10. The moving speed may be varied as the firing progresses to maintain optimum dimensional stability of the product ingot. In yet another embodiment, the heating source 5 comprises a plurality of burners (not shown), e.g., a single top center burner, multiple side burners, and multiple top-side burners, wherein the side and top-side burners are spaced apart for optimal firing of the rod feedstock.

The furnace atmosphere may comprise air, or an inert or noble gas. The furnace housing can be heated by radiation or induction. In one embodiment, the refractory furnace 6 is pre-heated by the burner 5 before the rod feedstock is introduced for reflow. In one embodiment, the interior of the furnace is first flushed with inert gas. In the next step, single pieces of the rod feedstock 10 are fed into the top of the reflow furnace and down onto the rotating platen base 7 where they form the larger ingot 11. As each rod 10 becomes fused into the larger ingot 11, additional feedstock rods are added while maintaining the axial symmetry of the rod and the fused ingot. The feedstock rods are added at a rate dependent on the temperature of the process and the rate of formation of the fused ingot 11.

In one embodiment, continuous feeding is accomplished by a partial fusion of a rod followed by withdraw of an un-fused length, then followed by introduction of a new feedstock rod. In another embodiment, continuous feeding is accomplished by the fusion of pre-joined rod feedstock for semi-continuous ingot fusion. In yet another embodiment, large ingots are directly fused from rod feedstock in a continuous process. The rod feedstock is made in a furnace by melting quartz sand at fusion temperatures between 1800° C. and 2500° C. with a residence time on the order of 1 to 10 hours, as the rod is being continuously drawn and fed directly into the process of the invention as feedstock 10.

In one embodiment, feedstock rods of different properties, e.g., made from natural silica, are alternatively fed in with rods made from synthetic silica, to produce quartz ingots having a layered structure with alternating layers of lower quality quartz material and higher quality quartz material. In an embodiment of a cladding structure, the ingot has an interior portion of a higher quality material made with a higher quality feedstock, and an outer portion made with a lower quality feedstock.

As more quartz glass material accumulates, the large fused ingot 11 is translated downward, away from the heat source 5 at a rate such that the outer diameter of the ingot is free-formed in a controlled manner. Once an acceptably large ingot 11 is formed, the rod feed 10 is stopped and the top surface of the ingot is flattened by continued flow from application of heat by the burner. Finally, the application of heat from the heat source 5 is discontinued and the ingot 11 is extracted from the furnace and cooled for post processing and inspection.

In one embodiment, the quartz glass ingot 11 is fused at a rate between 5 and 50 pounds per hour. In another embodiment, the quartz glass ingot is fused at a rate between 10 and 20 pounds per hour.

In the axi-symmetric reflow process of the invention, there is little potential for reflow defects in the fused ingot since the outer surface of the rod becomes the outer surface of the fused end-product. The bulk of the fused end-product is shielded from potential entrainment of defects and/or impurities that may be present in the feed system or the furnace atmosphere. As the axi-symmetric method prohibits successive laminations or layering of the feedstock material, there is little opportunity for interfaces to form within the ingot end-product.

Additionally in the process of the invention with the "free-formed" ingot, no container or mold is needed to form or maintain the diameter and or shape of the ingot. The absence of the mold (typically made of refractory brick material) helps reduce the potential for refractory contamination in the ingot, while also reducing the indirect material cost. Further, the free-formed ingot of the invention is less likely to fracture due to stresses associated with thermal expansion mismatch between the quartz glass ingot and refractory mold materials. Although an ingot mold is not necessary, platen 7 may include a raised edge provided such that such edge does not mold or shape the end-product ingot.

In the post-finishing operation, the end portion of end-product ingot 11 that is in direct contact with the refractory platen 7 is typically removed.

Ingots Produced from Process of the Invention:

As described, in the process of the invention using direct-drawn quartz glass rod as a feedstock rather than fusing quartz particulate in a deposition-oriented process, fusion quality is maintained at a high and well-controlled level. As rod feedstock is direct-drawn in a furnace where the quartz sand raw material is melted and held at fusion temperatures between 1800° C. and 2500° C. for long residence times on the order of 1 to 10 hours before being drawn into the fused product, the drawn quartz glass rod material is quite chemically homogeneous and has very low concentrations of bulk defects like inclusions or bubbles.

The use of rod feedstock with low concentrations of defects produces quartz glass articles in the form of ingots, plates, blanks, and the like, having a total defect concentration of less than 150 defects per $cm^3$ and a hydroxyl concentration of less than 150 ppm. In another embodiment, the glass ingots produced have less than 50 defects per $cm^3$ and a hydroxyl concentration of less than 50 ppm. In yet another embodiment, the ingots have less than 150 defects per $cm^3$ and a hydroxyl concentration of less than 50 ppm. In a fourth embodiment, less than 50 defects per $cm^3$ and a hydroxyl concentration of less than 150 ppm.

In one embodiment, the glass ingots produced have a hydroxyl concentration of less than 30 ppm over the hydroxyl concentration of the quartz feedstock. In one example, the amount is less than 20 ppm over the hydroxyl concentration of the quartz rods used as the feedstock.

Besides the very high fusion quality and economically favorable fusion rates, the process of the invention enables fusion of large-sized quartz glass articles. In one embodiment, the articles are in the form of glass ingots having a circular cylindrical shape, with an outer diameter between 6 inches and 24 inches and a height between 6 inches and 24 inches. In a third embodiment, the quartz glass ingot formed has a diameter ranging from 2 to 100 times the diameter of the quartz glass rod as the feedstock. In another embodiment, the ingot has a diameter of 5 to 50 times the diameter of the rod feedstock. In yet another embodiment, a diameter of 5 to 20 times the diameter of the rod feedstock.

EXAMPLES

The invention is further illustrated by the following non-limiting examples:

Example 1

A quartz ingot commercially available from Tosoh (or can also be obtained from St. Gobain) made using a sand-based flame fusion process was used as the comparative example.

Example 2

Using the process of the invention, quartz rods commercially available from General Electric Company as "Type 214" were used as the feedstock to produce ingots having a size of 12-inch diameter and 10 inches height. Type 214 quartz rod is characterized as having high purity, elevated temperature characteristics and low coefficient of thermal expansion with an (OH) level at less than 20 ppm.

Coupons of 3" diameter and about ¼" thickness were randomly cut from the quartz ingots and measured for OH concentration and defect levels. The OH measurements were made using infrared spectroscopy. Total defect density was visually measured under magnification. The results are tabulated below.

| Examples | OH (ppm) | Total Defect Density (#/cm$^3$) |
|---|---|---|
| 1. Sand-based Flame Fusion | 150 to 200 | >150 |
| 2. Axi-symmetric Free-forming | <50 | <50 |

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A process for manufacturing a quartz glass ingot, comprising the steps of:
   providing a fabricated quartz glass article as a feedstock,
   feeding the fused quartz glass feedstock into a furnace containing a platen rotating in axial symmetry to the quartz glass feedstock,
   heating the fused quartz glass feedstock to a temperature sufficient for the quartz feedstock to melt, and
   varying the temperature, the speed of the rotating platen, or both during the manufacturing process, thus forming the quartz glass ingot on the rotating platen in the absence of a container or mold.

2. The process of claim 1, further comprising the step of annealing the fabricated quartz glass article prior to feeding the quartz glass article as feedstock to the furnace.

3. The process of claim 1, further comprising the step of fusing a plurality of quartz rod segments into a fabricated quartz glass article prior to feeding the quartz glass article as feedstock to the furnace.

4. The process of claim 1, wherein the axial symmetry has a maximum eccentricity of no more than one feedstock diameter between the axes of the feedstock and the ingot.

5. The process of claim 1, wherein the quartz feedstock is selected from at least one of rods and tubings.

6. The process of claim 1, wherein the quartz glass ingot is formed at a rate between about 5 and 50 pounds per hour.

7. The process of claim 1, wherein the quartz glass ingot is formed at a rate between 10 and 20 pounds per hour.

8. The process of claim 1, wherein a heat source is used to apply heat either indirectly or directly onto the quartz glass feedstock, and wherein the heat source is at least one selected from the group consisting of: resistive heating, RF heating, microwave heating, laser heating, electron beam heating, plasma torch heating, zone heating, induction heating, and burner.

9. The quartz glass article of claim 8, wherein the heat source is at least one selected from the group consisting of: a single top center burner, multiple side burners, and multiple top-side burners.

* * * * *